US012377862B2

(12) United States Patent
Kumbar et al.

(10) Patent No.: US 12,377,862 B2
(45) Date of Patent: Aug. 5, 2025

(54) DATA DRIVEN CUSTOMIZATION OF DRIVER ASSISTANCE SYSTEM

(71) Applicant: Atieva, Inc., Newark, CA (US)

(72) Inventors: Kshitij Tukaram Kumbar, Fremont, CA (US); Sharath Avadhanam, Milpitas, CA (US); Jinwoo Lee, Hayward, CA (US)

(73) Assignee: Atieva, Inc., Newark, CA (US)

(*) Notice: Subject to any disclaimer, the term of this patent is extended or adjusted under 35 U.S.C. 154(b) by 123 days.

(21) Appl. No.: 18/193,219

(22) Filed: Mar. 30, 2023

(65) Prior Publication Data
US 2024/0067187 A1  Feb. 29, 2024

Related U.S. Application Data

(60) Provisional application No. 63/373,659, filed on Aug. 26, 2022.

(51) Int. Cl.
*B60W 50/00* (2006.01)
*B60W 40/12* (2012.01)

(52) U.S. Cl.
CPC ..... *B60W 40/12* (2013.01); *B60W 2554/4045* (2020.02)

(58) Field of Classification Search
CPC ......... B60W 40/12; B60W 2554/4045; B60W 50/00; B60W 2050/0052;
(Continued)

(56) References Cited

U.S. PATENT DOCUMENTS 9,008,890 B1  4/2015 Herbach et al.
9,308,915 B2  4/2016 Huth et al.
(Continued)

FOREIGN PATENT DOCUMENTS

DE  102018001003 A1  8/2018
DE  102018207023 A1  11/2019
(Continued)

OTHER PUBLICATIONS

International Search Report and Written Opinion for PCT Application No. PCT/US2023/072948, mailed on Nov. 28, 2023, 14 pages.
(Continued)

*Primary Examiner* — Peter D Nolan
*Assistant Examiner* — Chanmin Park
(74) *Attorney, Agent, or Firm* — Brake Hughes Bellermann LLP

(57) ABSTRACT

A computer-implemented method comprises: receiving first telemetry data generated by sensors of respective first vehicles in a fleet; clustering the first telemetry data into groups, each of the groups representing a profile of one or more first drivers of the first vehicles in the fleet; receiving second telemetry data generated by sensors of a second vehicle controlled by a second driver; associating the second driver with a first group of the groups by classifying the received second telemetry data; providing a subset of the first telemetry data corresponding to the first cluster as a baseline dataset for training of machine learning algorithms; generating baseline tuning parameter values using the trained machine learning algorithms; and providing the baseline tuning parameter values to a driver assistance system of a third vehicle controlled by the second driver.

23 Claims, 7 Drawing Sheets

(58) Field of Classification Search
CPC ..... B60W 2050/0075; B60W 2540/30; B60W 2556/05; B60W 2556/45; B60W 2556/55
See application file for complete search history.

(56) References Cited

U.S. PATENT DOCUMENTS

| | | | |
|---|---|---|---|
| 10,481,613 | B2 | 11/2019 | Schroeder et al. |
| 2007/0220591 | A1 | 9/2007 | Damodaran et al. |
| 2010/0027780 | A1 | 2/2010 | Jung et al. |
| 2010/0306048 | A1 | 12/2010 | Corduneanu et al. |
| 2016/0253495 | A1* | 9/2016 | Kolacinski ............... G06N 7/01 726/23 |
| 2017/0174221 | A1 | 6/2017 | Vaughn et al. |
| 2018/0004211 | A1 | 1/2018 | Grimm et al. |
| 2018/0362049 | A1* | 12/2018 | Avireddi ............. B60W 50/082 |
| 2018/0365740 | A1 | 12/2018 | Nix et al. |
| 2018/0373980 | A1 | 12/2018 | Huval |
| 2019/0039545 | A1 | 2/2019 | Kumar et al. |
| 2019/0047584 | A1 | 2/2019 | Donnelly |
| 2019/0220028 | A1 | 7/2019 | Anderson |
| 2019/0278297 | A1 | 9/2019 | Averhart et al. |
| 2020/0164882 | A1 | 5/2020 | Beiderbeck et al. |
| 2021/0073626 | A1 | 3/2021 | Brahma et al. |
| 2022/0032939 | A1 | 2/2022 | Urano et al. |
| 2022/0035371 | A1 | 2/2022 | Chan et al. |
| 2022/0126878 | A1 | 4/2022 | Moustafa et al. |
| 2022/0136474 | A1 | 5/2022 | Ostrowski et al. |
| 2022/0169265 | A1 | 6/2022 | Wu et al. |
| 2024/0007414 | A1* | 1/2024 | Jain .................... H04L 41/0823 |

FOREIGN PATENT DOCUMENTS

| | | |
|---|---|---|
| EP | 3415392 A1 | 12/2018 |
| EP | 3620881 A1 | 3/2020 |
| WO | 2023076903 A1 | 5/2023 |

OTHER PUBLICATIONS

SAE International: "Surface Vehicle Recommended Practice, Taxonomy and Definitions for Terms Related to Driving Automation Systems for On-Road Motor Vehicles," J3016, Jun. 2018, 35 pages.
Yan, Shenao, et al., "Correlations Between Deep Neural Network Model Coverage Criteria and Model Quality", ESEC/FSE 2020: Proceedings of the 28th ACM Joint Meeting on European Software Engineering Conference and Symposium on the Foundations of Software Engineering; https://doi.org/10.1145/3368089.3409671; Nov. 13, 2020, 13 pages.

* cited by examiner

DATA DRIVEN CUSTOMIZATION OF DRIVER ASSISTANCE SYSTEM

CROSS-REFERENCE TO RELATED APPLICATION

This application claims benefit, under 35 U.S.C. § 119, of U.S. Provisional Patent Application No. 63/373,659, filed on Aug. 26, 2022, entitled "DATA DRIVEN CUSTOMIZATION OF DRIVER ASSISTANCE SYSTEM," the disclosure of which is incorporated by reference herein in its entirety.

TECHNICAL FIELD

This document relates to data driven customization of a driver assistance system.

BACKGROUND

Vehicle transportation is ubiquitous in today's society. Large percentages of the population in many countries have a driver license for, or is otherwise competent to handle, one or more sorts of vehicles. While there are many different types of vehicles that can be driven by such individuals, the many drivers also differ from each other in their driving styles. Anyone who travels in traffic may observe the significant variety among drivers in terms of driving skills, driving preferences, and driving practices. No two drivers are exactly alike.

SUMMARY

In a first aspect, a computer-implemented method comprises: receiving first telemetry data generated by sensors of respective first vehicles in a fleet; clustering the first telemetry data into groups, each of the groups representing a profile of one or more first drivers of the first vehicles in the fleet; receiving second telemetry data generated by sensors of a second vehicle controlled by a second driver; associating the second driver with a first group of the groups by classifying the received second telemetry data; providing a subset of the first telemetry data corresponding to the first cluster as a baseline dataset for training of machine learning algorithms; generating baseline tuning parameter values using the trained machine learning algorithms; and providing the baseline tuning parameter values to a driver assistance system of a third vehicle controlled by the second driver.

Implementations can include any or all of the following features. The computer-implemented method further comprises filtering the first telemetry data to filtered telemetry data, wherein clustering the first telemetry data into the groups comprises clustering the filtered telemetry data into the groups. The computer-implemented method further comprises augmenting the first telemetry data to augmented telemetry data, wherein clustering the first telemetry data into the groups comprises clustering the augmented telemetry data into the groups. The computer-implemented method further comprises performing dimension reduction on the received first telemetry data to generate dimension-reduced telemetry data, wherein clustering the first telemetry data into the groups comprises clustering the dimension-reduced telemetry data into the groups. Performing the dimension reduction on the received first telemetry data comprises projecting the received first telemetry data into an abstract space. Projecting the received first telemetry data into the abstract space comprises combining first and second values with each other, the first and second values having different physical units. Classifying the received second telemetry data comprises projecting the received second telemetry data into the abstract space. The baseline tuning parameter values control at least one aspect of the driver assistance system, the aspect including one or more of a distance between the third vehicle and an object, a speed of the third vehicle, a trajectory of the third vehicle, or an acceleration of the third vehicle. The third vehicle is the second vehicle. Receiving the second telemetry data includes performing event detection to record a specific scenario. Clustering the first telemetry data into the groups comprises specifying how many the groups must be. The computer-implemented method further comprises, before providing the baseline dataset for the training of the machine learning algorithms, obfuscating an association between the baseline dataset and the second driver. Obfuscating the association between the baseline dataset and the second driver comprises applying a hash function to (i) a vehicle identification number of the second vehicle and to (ii) a user identifier for the second driver. The computer-implemented method further comprises training a feature generation algorithm using the second telemetry data. The feature generation algorithm is trained to generate a parameter value candidate for at least one of (i) a time gap; (ii) a lane change duration parameter; (iii) a distance from an exit to a lane change; (iv) a lane bias; (v) in a lateral direction, a velocity, acceleration, or jerk; or (vi) a parking distance. The machine learning algorithms include at least one of a regression algorithm or a classification algorithm.

In a second aspect, a computer program product tangibly embodied in a non-transitory storage medium includes instructions that when executed cause a processor to perform operations, the operations comprising: receiving first telemetry data generated by sensors of respective first vehicles in a fleet; clustering the first telemetry data into groups, each of the groups representing a profile of one or more first drivers of the first vehicles in the fleet; receiving second telemetry data generated by sensors of a second vehicle controlled by a second driver; associating the second driver with a first group of the groups by classifying the received second telemetry data; providing a subset of the first telemetry data corresponding to the first cluster as a baseline dataset for training of machine learning algorithms; generating baseline tuning parameter values using the trained machine learning algorithms; and providing the baseline tuning parameter values to a driver assistance system of a third vehicle controlled by the second driver.

Implementations can include any or all of the following features. The operations further comprise filtering the first telemetry data to filtered telemetry data, wherein clustering the first telemetry data into the groups comprises clustering the filtered telemetry data into the groups. The operations further comprise augmenting the first telemetry data to augmented telemetry data, wherein clustering the first telemetry data into the groups comprises clustering the augmented telemetry data into the groups. The operations further comprise performing dimension reduction on the received first telemetry data to generate dimension-reduced telemetry data, wherein clustering the first telemetry data into the groups comprises clustering the dimension-reduced telemetry data into the groups. The operations further comprise, before providing the baseline dataset for the training of the machine learning algorithms, obfuscating an association between the baseline dataset and the second driver. The operations further comprise training a feature generation algorithm using the second telemetry data.

BRIEF DESCRIPTION OF DRAWINGS

Like reference symbols in the various drawings indicate like elements.

DETAILED DESCRIPTION

Figure 1:
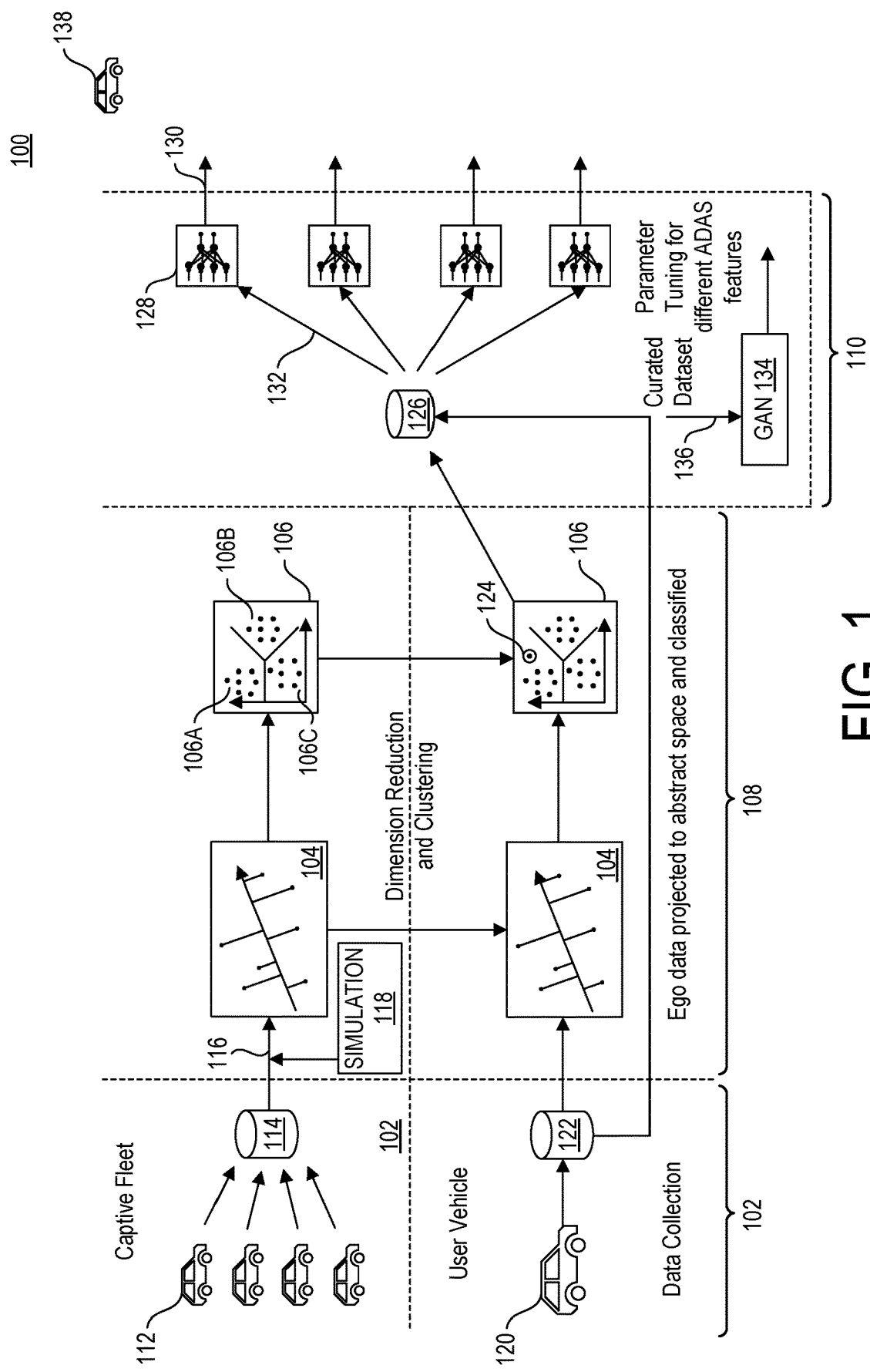
FIG. 1 shows an example of a system that can perform data driven customization of a driver assistance system.

This document describes examples of systems and techniques for data driven customization of a driver assistance system. An approach according to the present disclosure can collect information about a driving history for a fleet of test vehicles; perform classification of a current vehicle driver based on the previously recorded behavior of the test fleet; and use the classification to provide at least one parameter to a driver assistance system. Any kind of learnable parameter can be determined and provided. In some implementations, abstract driving profiles can be used to directly influence the ego driver's assistance systems in a manner that is amenable to the user over time. Examples include, but are not limited to, a user-specific time gap setting applied to active cruise control, or a lane change maneuver duration for lane change assistance.

The present subject matter can provide a system to generate feature parameters for one or more specific driver assistance systems like active cruise control, lane change suggestion, lane change assist, etc., by profiling a user's driving profile based on a set of learned abstract driving profiles. This encapsulation can provide a baseline for tuning the specific parameters influencing any given driver assistance system, thus ensuring that the system can be further tailored to a user's driving preferences. Apart from learning the user's tangible and comprehensible preferences, the system can also strive to learn the driver's hidden preferences to further fit the driver's inherent driving profile and hence further incentivize the person to use the driver assistance system. Such a system can be favorable for the user as it conforms to the driver's tendencies. For example, for a feature like active cruise control, users have individual preferences for the distance at which the ego vehicle should be for different time gap settings. A typical time gap setting range might be too aggressive, or too conservative, depending on the user's preference. The present disclosure can produce baseline time gap settings that are closer to the user's driving tendencies in different driving conditions (e.g., conservative in adverse weather conditions, aggressive in heavy traffic), thus resulting in a feature implementation that is closer to the user's liking and hence would be more likely to be viewed favorably by the user.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, the vehicle that is the subject of the example (e.g., the one having a driver assistance system) is sometimes referred to as the "ego vehicle". Vehicles shown in the drawings are illustrated as being similar to each other for illustrative purposes only.

Examples described herein refer to a human being as the driver of a vehicle. As used herein, the term driver includes a human being that is being transported by a vehicle, regardless of the state of automation (if any) with which the vehicle is equipped, and regardless of whether a driver assistance system of the vehicle is currently active. As such, for simplicity a person can here be referred to as a driver of the vehicle both when the person is driving the vehicle and when a driver assistance system is operating.

Examples described herein refer to a driver assistance system. A driver assistance system at least partially automates one or more dynamic driving tasks to perform assisted driving. A driver assistance system operates based in part on the output of one or more sensors typically positioned on, under, or within the vehicle. While an autonomous vehicle is an example of a driver assistance system, not every driver assistance system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples described herein refer to machine-learning algorithms. As used herein, a machine-learning algorithm can include an implementation of artificial intelligence where a machine such as an assisted-driving system has capability of perceiving its environment and taking actions to achieve one or more goals. A machine-learning algorithm can apply one or more principles of data mining to define driver profiles from data collected regarding a fleet of vehicles and their related circumstances. A machine-learning algorithm can be trained in one or more regards. For example, supervised, semi-supervised, and/or unsupervised training can be performed. In some implementations, a machine-learning algorithm can make use of one or more classification algorithms, or classifiers for short. For example, a classifier can assign one or more labels to instances recognized in processed data. In some implementations, a machine-learning algorithm can make use of one or more forms of regression analysis. For example, a machine-learning algorithm can apply regression to determine one or more numerical values. In some implementations, a machine-learning algorithm can be configured to collect and store data, detect events using the data, identify the context(s) using the data, and generate a driving envelope based at least in part on a detected event and the context(s).

Examples described herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., a light ranging and detection (LiDAR) device); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); a torque sensor; a thermal sensor; a temperature sensor (e.g., a primary or secondary thermometer); a pressure sensor (e.g., for ambient air or a component of the vehicle); a humidity sensor (e.g., a rain detector); or a seat occupancy sensor.

FIG. 1 shows an example of a system 100 that can perform data driven customization of a driver assistance system. The system 100 can be used with one or more other examples described elsewhere herein. The system 100 includes a system 102 for vehicle telemetry collection, an algorithm 104 for dimensionality reduction, an algorithm 106 for data clustering, a system 108 for user driving profile classification, and a system 110 for parameter learning. One or more of the system 102, algorithms 104 or 106, or systems 108 or 110, can be implemented as a standalone separate system, or can be integrated with at least one other component of the system 100, to name just some examples. In short, multiple sets of data can be received using the system 102 (e.g., fleet data and user data), and go through the algorithms 104 and 106. Data from the test fleet can create a bifurcation, such as through a labeling process that creates sections or divisions between groups of drivers according to their behavior. For the data from the user, moreover, this bifurcation can be used in classifying the user data.

The system 102 can be or include a vehicle telemetry collection system that collects vehicle telemetry data from a fleet of vehicles 112. Such data can include, but is not limited to, position information (e.g., longitude or latitude), velocity, acceleration, lane position, or yaw rate. The vehicle telemetry data can include a sensor reading from any or all sensors of the vehicle. For example, the vehicle telemetry data can reflect or otherwise indicate a circumstance regarding the vehicle and/or an action taken by the driver. The vehicle telemetry data can reflect or otherwise indicate the occurrence of one or more events and/or driver triggers, in the presence of one or more context parameters. For example, the vehicle telemetry data can reflect or otherwise indicate a lane change event. As another example, the vehicle telemetry data can reflect or otherwise indicate that the driver takes (or does not take) one or more actions that would trigger a response from the vehicle. As another example, the vehicle telemetry data can reflect or otherwise indicate the presence or absence of one or more ambient conditions (e.g., the presence or absence of a particular weather phenomenon). In some implementations, the vehicle telemetry data can include sensor data reflecting how a person drives the vehicle. For example, this can allow the person's driving preferences and driving characteristics to be analyzed and taken into account in customizing a driver assistance system. In some implementations, the vehicle telemetry data can include sensor data reflecting a user's response to how a driver assistance system controls the vehicle. For example, the user can provide feedback by taking over control of the vehicle from the driver assistance system.

The fleet of the vehicles 112 can be referred to as a captive fleet in the sense that the vehicles are subject to reporting some or all of their sensor registrations or other telemetry data to the system 100. The vehicles 112 can all be of the same kind, type, or model, or one or more of the vehicles 112 can be of a different kind/type/model, to name just some examples. Vehicle telemetry data 114 collected from the vehicles 112 can span a large variety of driving conditions and/or diverse driving scenarios. In some implementations, the vehicles 112 are a fleet of testing vehicles owned and operated by the manufacturer of the vehicles 112.

An arrow 116 here schematically illustrates that one or more operations can be performed on the vehicle telemetry data 114. The vehicle telemetry data 114 can be filtered. In some implementations, filtering can be performed based on usability or requirements of the algorithm 104 or 106. For example, usability filtering can involve checking whether the data is plausible or whether it appears corrupted (e.g., due to sensor fault). As another example, if the vehicle telemetry data 114 lacks data from highway driving during rain, then data from rainy conditions can be preferred. As such, the vehicle telemetry data 114 can be filtered to generate filtered vehicle telemetry data.

The vehicle telemetry data 114 can be augmented. In some implementations, the augmentation is performed based on a simulation 118. The simulation 118 can represent a fictitious environment that corresponds to one or more edge-case scenarios that may occur very seldom or not at all in the vehicle telemetry data 114. The augmentation can then provide sensor output values or other data reflecting the simulated situation or condition. The augmentation can allow the algorithms 104 or 106 to be aware of a wider range of situations. As such, the vehicle telemetry data 114 can be augmented to generate augmented vehicle telemetry data.

The system 108 can perform user driving profile classification. In so doing, the system 108 can apply the algorithms 104 and 106 to the vehicle telemetry data 114 to define groups of driver profiles, and then classify a vehicle driver as belonging to one of the groups. In some implementations, the system 108 applies the algorithm 104 to perform dimension reduction on the vehicle telemetry data 114 to generate dimension-reduced telemetry data. Dimension reduction can be useful in understanding combinations of features that may give maximum benefit, and/or can be useful in reducing compute time for training. The vehicle telemetry data 114 can include a great number of fields. Some fields (e.g., the output of one or more specific sensors or other vehicle components) may not be particularly helpful for characterizing the vehicle driver's profile. Accordingly, such relatively unhelpful fields can be ignored or removed from the vehicle telemetry data 114. Performing the dimension reduction on the vehicle telemetry data 114 can include projecting the vehicle telemetry data 114 into an abstract space. The abstract space can have the reduced dimensionality compared to the original dataset of the vehicle telemetry data 114. This can increase efficiency and simplify the data analysis.

In some implementations, projecting to an abstract space can involve adding a dimension to the vehicle telemetry data 114 that may not have real-world significance. The vehicle telemetry data 114 may include information about a vehicle separation gap in an adjacent lane that a driver accepts as sufficiently large for a lane change, and also speed information about how fast the vehicle 112 is traveling at the time the driver contemplates merging into that lane nearby. The vehicle separation gap is here the distance between the rear of one vehicle and the front of the vehicle behind it, and is measured as a physical entity having a dimensionality of distance. The speed information, by contrast, is not a distance but rather a physical entity having a dimensionality of speed (e.g., miles per hour or meters per second). That is, the vehicle separation gap and the speed information have different physical units. As such, combining these values (e.g., by adding the values together) may not correspond to any physical entity in the real world (e.g., may not be a physically intuitive concept), but the system 108 can perform this projection to an abstract space in order to aid the classification of the user into a particular group of driver profiles. Other combinations can be used in addition or alternatively. For example, the separation between vehicles in the adjacent lane (i.e., a distance measurement), and a velocity at which the driver performs the lane change (i.e., a speed measurement), can be combined. Any of multiple ways of combining parameter values having different physical units can be used. For example, the combination can involve a weighted addition. The dimension reduction (e.g., projecting to one or more abstract spaces) can be performed in an automated fashion. For example, principal component analysis can be used.

Projecting to an abstract space can add a layer of anonymity for the data. For example, the data could otherwise support certain inferences relating to the driver based on knowing, say, the latitude or longitude position data of the vehicle's travel.

Projecting to an abstract space can reduce or prevent engineering bias toward certain parameters of the data. For example, an engineer may otherwise have a tendency to overly emphasize certain parameters based on empirical understanding. In prior approaches, an engineer might have gone with a heuristic approach of trying to classify the vehicles 112 looking at the parameters the engineer has been trained to deal with, such as speed, acceleration, lateral distance, or how much the vehicles moves. The engineer may, unknowingly or deliberately based on previous experience, have a bias for or against any of the familiar parameters. Reducing or preventing engineering bias is therefore useful. This can be even more important considering that the system 100 may ultimately be seeking to learn the subconscious preferences of a driver, so as to be able to tailor that driver's driver assistance towards these preferences. Engineering bias, unless mitigated, could negate or mask such hidden preferences and thwart the effort.

In some implementations, the dimension reduction can be omitted. For example, if the vehicle telemetry data 114 includes just a few (e.g., two) parameters, this may not be sufficient for classifying into one group or another. As such, the dimension reduction can be omitted if it may result in losing representation of data.

The algorithm 106 can include a clustering algorithm for the vehicle telemetry data 114. When the data has been projected to an abstract space, the data can be clustered into any of multiple abstract groups. The clusters can correspond to respective driving behaviors in one or more regards. For example, a group of driers can behave similarly under certain conditions. Here, the algorithm 106 is schematically shown to have clustered the vehicle telemetry data 114 into respective ones of groups 106A, 106B, or 106C. More or fewer groups than shown can be used. The groups 106A-106C can, but do not necessarily, correspond to driver characterizations such as conservative, nominal, or aggressive drivers, respectively; or characterizations such as having quick or slow reaction time. Rather, the groups into which the algorithm 106 clusters the vehicle telemetry data 114 can be any classification that groups drivers exhibiting similar behavior, or having similar performances, into a common bucket. For example, if the abstract dimension is the (weighted) sum of a speed and a distance, the groups 106A-106C can reflect how the behaviors of the individual drivers of the vehicles 112 fall within that space. That is, the groups 106A-106C can serve as an abstraction of typical driving profiles of the drivers that generated the vehicle telemetry data 114.

In some implementations, one or more engineering preferences can be applied in performing the algorithm 106. For example, the number of the clusters (e.g., three groups, or a different number) can be specified. As another example, the algorithm 106 can specify the accuracy of the clusters. The preferences can be defined taking into account requirements of the customization process, and/or resource constraints. For example, clustering into fewer groups can be a faster operation than clustering into more groups. As such, clustering the vehicle telemetry data 114 into the groups 106A-106C can include specifying how many the groups must be (e.g., three).

The application of the algorithms 104 and 106 exemplified above can produce the bifurcation mentioned above, wherein the vehicle telemetry data 114 from the vehicles 112 of the fleet is being used in developing tuning parameters for one or more individual drivers. Examples of the latter will now be described.

The system 102 for vehicle telemetry collection can also involve collecting data from a vehicle 120 driven by a user. The vehicle 120 can be one of the vehicles 112 used at a different time than when the telemetry data 114 is collected, or the vehicle 120 can be a separate vehicle that is not part of the fleet. The vehicle 120 can be of the same kind, type, or model, as one or more of the vehicles 112, or the vehicle 120 can be of a different kind/type/model.

Here, the system 102 collects vehicle telemetry data 122 from the vehicle 120. The vehicle telemetry data 122 can include, but is not limited to, position information (e.g., longitude or latitude), velocity, acceleration, lane position, or yaw rate. The vehicle telemetry data 122 can span a large variety of driving conditions and/or diverse driving scenarios. The vehicle telemetry data 122 may not be specifically labeled for any particular condition regarding the driving. For example, this can maintain the generality of the data and the anonymity of the driver. The vehicle telemetry data 122 can provide a balanced dataset of the driving tendencies of the user who is operating the vehicle 120, for whom the driver assistance system is to be customized.

Event detection can be performed to collect the vehicle telemetry data 122. Examples of event detection are provided below. In some implementations, event detection can be used to record specific scenarios to speed up the dataset generation for the user. For example, the event of highway driving, and/or a sudden braking or acceleration or turning, can be detected.

The system 108 can project the vehicle telemetry data 122 to the same dimensions (e.g., the same abstract space(s)) as the vehicle telemetry data 114. For example, the algorithm 104 can be used to reduce the number of dimensions. The system 108 can classify the vehicle telemetry data 122 based on the groups that were generated using the algorithm 106. In some implementations, it can be determined which of the groups 106A-106C the vehicle telemetry data 122 best fits. The vehicle telemetry data 114 of the fleet defines the dimension(s) against which one can use the individual user's data. For example, here a classification 124 schematically illustrates that the vehicle telemetry data 122 is closest to, and has been classified into, the group 106A. That is, the classification always associates the vehicle telemetry data 122 with one of the groups resulting from the clustering of the vehicle telemetry data 114 by the algorithm 106.

The cluster (i.e., the subset of the data classified under a single cluster) can then serve as a baseline dataset 126 for training of machine-learning algorithms 128 by the system 110. The baseline dataset 126 can be characterized as a curated dataset in that the algorithms 104 and/or 106 may have improved the vehicle telemetry data 122 in one or more regards. That is, the system 110 can be used for parameter learning from the baseline dataset 126. The baseline dataset 126 can be used for training the machine-learning algorithms 128. Each of the machine-learning algorithms 128, once trained, provides baseline tuning parameter values 130 for a driver assistance system. The training can be performed in the vehicle having the driver assistance system, or remotely from that vehicle (sometimes referred to as offline training). For example, computer clusters operated by the vehicle manufacturer can perform offline training. As another example, offline training can be performed in a distributed way using cloud computing resources.

The training of the machine-learning algorithms 128 is here schematically illustrated using an arrow 132. The machine-learning algorithms 128 can include regression algorithms. In some implementations, regression analysis can be performed on vehicle telemetry data to determine one or more numerical values regarding vehicle motion or other characteristics. For example, the regression can generate a value for a time, a duration, a distance, a velocity, an acceleration, and/or jerk regarding the vehicle.

The machine-learning algorithms 128 can include classification algorithms. In some implementations, classification can be performed to apply labels to vehicle telemetry data regarding vehicle motion or other characteristics. For example, the classification can label a time, a duration, a distance, a velocity, an acceleration, and/or jerk regarding the vehicle.

In the training, the association between the baseline dataset 126 and the driver of the vehicle 120 can be obfuscated. For example, a unique hash function can be applied to a vehicle identification number (VIN) and a user identifier for the driver of the vehicle 120. The user identifier (e.g., registered by a driver monitoring system in the vehicle) can be helpful as part of the vehicle telemetry data 122, for example because the user identifier allows customization of the driver assistance system for more than one driver of the vehicle.

Feature generation can be performed. In some implementations, the baseline dataset 126 can be used to train specialized feature generation algorithms. Here, training of a feature generation algorithm 134 (e.g., a Generalized Adversarial Network, or GAN) is schematically illustrated using an arrow 136. The training can be performed in conjunction with user-specific driving data. For example, this can further finetune specific comfort parameters for the feature(s). In some implementations, the baseline dataset 126 can be used with a GAN to generate parameter value candidates. For example, such candidates can include, but are not limited to, a time gap (e.g., to a vehicle in front of the vehicle being driven) and/or a lane change duration parameter (e.g., the amount of time the driver takes in changing from one lane to another.) In the future, if more complicated features are used, the feature generation algorithm 134 can provide candidate values for the feature(s).

The baseline tuning parameter values 130 can be provided to a driver assistance system of a vehicle 138 controlled by the driver of the vehicle 120. That is, the baseline tuning parameter values 130 are now applied to customize the driver assistance system according to the classification of this driver into one of the abstract driver profiles that were defined from fleet data. The vehicle 138 can be one of the vehicles 112 or 120, or the vehicle 138 can be a separate vehicle that is not part of the fleet and has not been used in generating the vehicle telemetry data 114 or 122. The vehicle 138 can be of the same kind, type, or model, as one or more of the vehicles 112 or 120, or the vehicle 138 can be of a different kind/type/model.

The baseline tuning parameter values 130 can control at least one aspect of the driver assistance system. In some implementations, the aspect(s) can include one or more of a distance between the vehicle 138 and an object, a speed of the vehicle 138, a trajectory of the vehicle 138, or an acceleration of the vehicle 138, to name just a few examples.

The above-described examples illustrate that a computer-implemented method can include: receiving first telemetry data (e.g., the vehicle telemetry data 114) generated by sensors of respective first vehicles (e.g., the vehicles 112) in a fleet; clustering (e.g., using the algorithm 106) the first telemetry data into groups (e.g., the groups 106A-106C), each of the groups representing a profile of one or more first drivers of the first vehicles in the fleet; receiving second telemetry data (e.g., the vehicle telemetry data 122) generated by sensors of a second vehicle (e.g., the vehicle 120) controlled by a second driver; associating the second driver with a first group of the groups by classifying the received second telemetry data (e.g., the classification 124); providing a subset of the first telemetry data corresponding to the first cluster as a baseline dataset (e.g., the baseline dataset 126) for training of machine-learning algorithms (e.g., the machine-learning algorithms 128); generating baseline tuning parameter values (e.g., the baseline tuning parameter values 130) using the trained machine-learning algorithms; and providing the baseline tuning parameter values to a driver assistance system of a third vehicle (e.g., the vehicle 138) controlled by the second driver.

Figure 2:
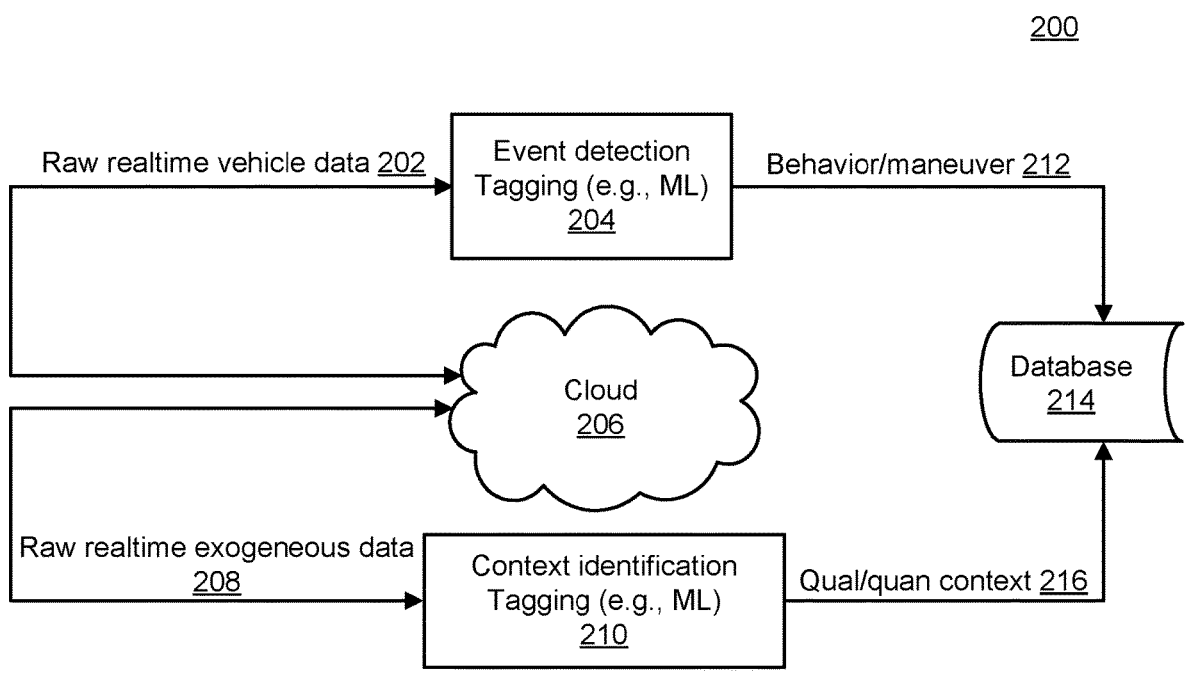
FIG. 2 shows a flow chart of an example of collecting data for data driven customization of a driver assistance system.

FIG. 2 shows a flow chart of an example 200 of collecting data for data driven customization of a driver assistance system. The example 200 can be used with one or more other examples described elsewhere herein. The example 200 and/or one or more of its components can operate by way of at least one processor executing instructions stored in a computer-readable medium, for example as described below with reference to FIG. 8. In some implementations, the example 200 can be used in collecting information about a driving history for a fleet of test vehicles for use in performing classification of a vehicle driver to provide at least one parameter to a driver assistance system for that driver.

The example 200 involves a component 204 that can perform event detection. In some implementations, the component 204 can detect behaviors and/or maneuvers executed by the driver. In some implementations, the component 204 can monitor the driver's behavior to identify the maneuver(s) as being member of one or more discrete sets. Examples include, but are not limited to, a lane change, following a lead vehicle in lane, staying in lane without a lead vehicle, a hard braking, or a reduction or increase in time gap. The component 204 can identify the quantitative or qualitative endogenous metric(s) associated with, or characterizing, the event. Examples include, but are not limited to, determining a duration and/or speed of a lane change, determining a time gap to a lead vehicle when following, determining the speed at which the driver stays in lane when no lead vehicle is present, and/or determining the negative acceleration when creating a gap in front of the ego vehicle to allow another vehicle to enter the lane. The component 204 can include one or more aspects of a machine-learning algorithm. In some implementations, the component 204 can depend on, or be provided by, a driver assistance system for a vehicle. For example, the driver assistance system can be installed in the same vehicle, and the detection of the event(s) can be performed by the driver assistance system. In some implementations, the component 204 can identify at least one event in vehicle telemetry data, and apply a tag to the identified event.

The example 200 involves a component 210 for context identification. The component 210 can detect external operating conditions under which the driver does (or does not) execute operations detected as events. In some implementations, the component 210 can collect quantitative or qualitative exogenous metrics related to the event(s). In some implementations, the component 210 can tag the weather, traffic conditions, road curvature, and/or road state. The component 210 can include one or more aspects of a machine-learning algorithm.

Data 202 enters the example 200. In some implementations, the data 202 can be characterized as raw realtime vehicle data. The data can come from one or more sensors of the vehicle (e.g., from a sensor suite dedicated to a driver assistance system).

The data 202 can be provided to one or more aspects of the example 200. The data 202 can be provided to the component 204. In some implementations, the component 204 can be responsible for detecting events in the data 202, and for tagging the data according to the detection. For example, the component 204 can apply one or more aspects of a machine-learning algorithm in its operation. The data 202 can be provided to a cloud 206.

Data 208 enters the example 200. In some implementations, the data 208 can be characterized as raw realtime exogeneous data and can be context data pertaining to a vehicle being monitored. The data can come from one or more sensors of the vehicle (e.g., from a sensor suite dedicated to a driver assistance system) and/or from an external source (e.g., a weather report service, a mapping service, or a road condition reporter).

The data 208 can be provided to one or more aspects of the example 200. The data 208 can be provided to the component 210. In some implementations, the component 210 can be responsible for detecting contexts in the data 208, and for tagging the data according to the detection. For example, the component 210 can apply one or more aspects of a machine-learning algorithm in its operation. The data 208 can be provided to the cloud 206.

The component 204 can generate output 212. In some implementations, the output 212 reflects a behavior or maneuver by the driver of the vehicle. The output 212 can be provided with a suitable format and can be stored in a database 214.

The component 210 can generate output 216. In some implementations, the output 216 reflects a qualitative or quantitative context of the output 212 (e.g., as relevant to the behavior or maneuver by the driver of the vehicle). The output 216 can be provided with a suitable format and can be stored in the database 214.

The database 214 can be updated with new information at regular intervals or at random times. In some implementations, the database 214 is updated when the component 204 and/or 210 generates new output. For example, this can result in updates of the database 214 taking place one or more minutes apart from each other. As data accumulates in the database 214, a software algorithm can update one or more driving envelopes and increase the accuracy or precision of its boundaries. As such, the database 214 can be used for collecting information constituting the vehicle telemetry data 114 and/or 122.

Figure 3:
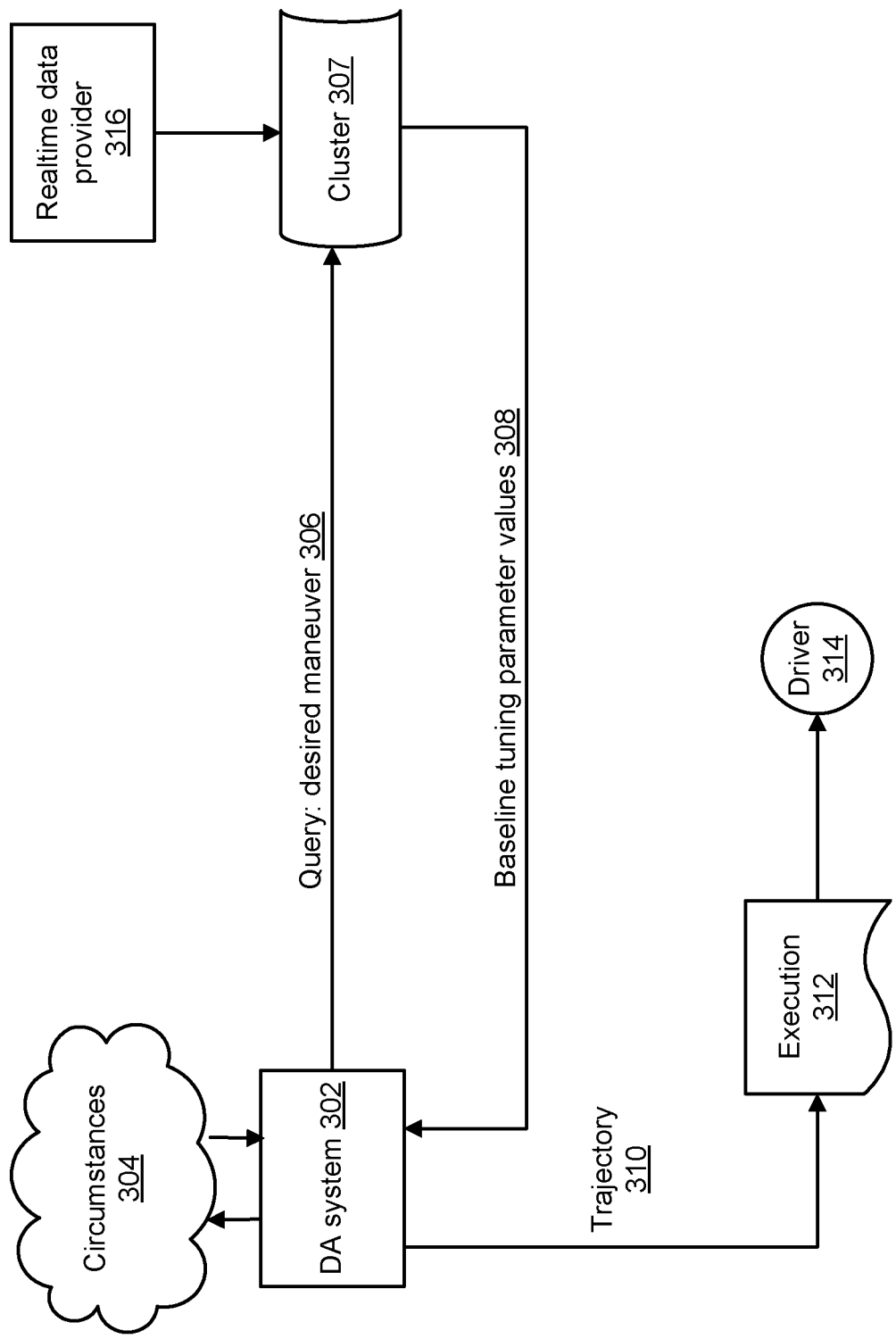
FIG. 3 shows a flow chart of an example of providing baseline tuning parameter values to a driver assistance system of a vehicle.
Figure 4:
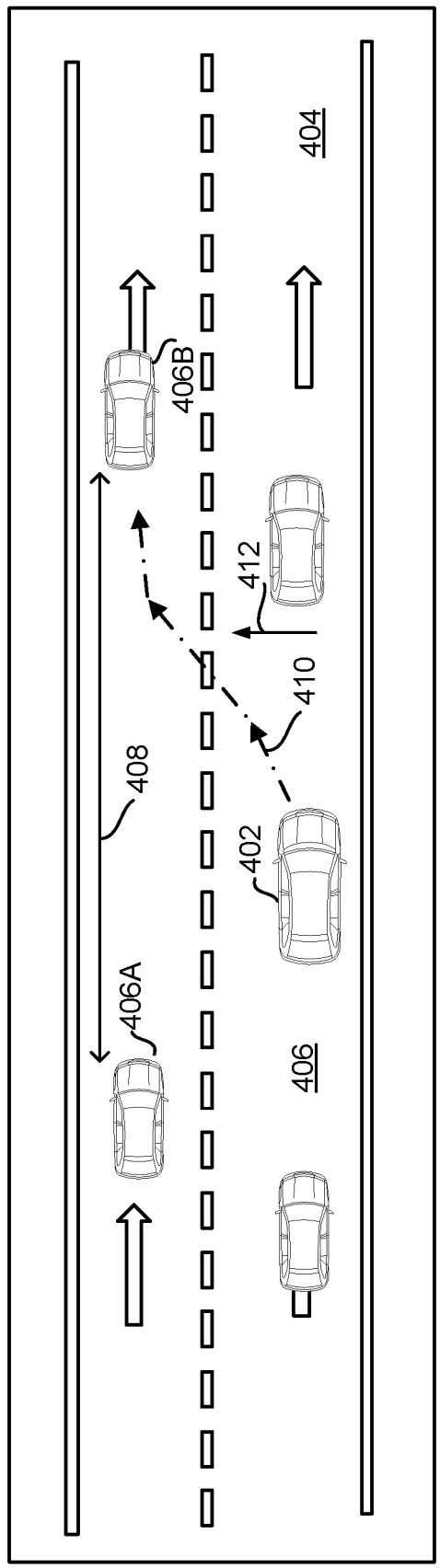
FIGS. 4-7 show examples of applying a baseline tuning parameter value in performing an action with regard to a vehicle.
Figure 5:
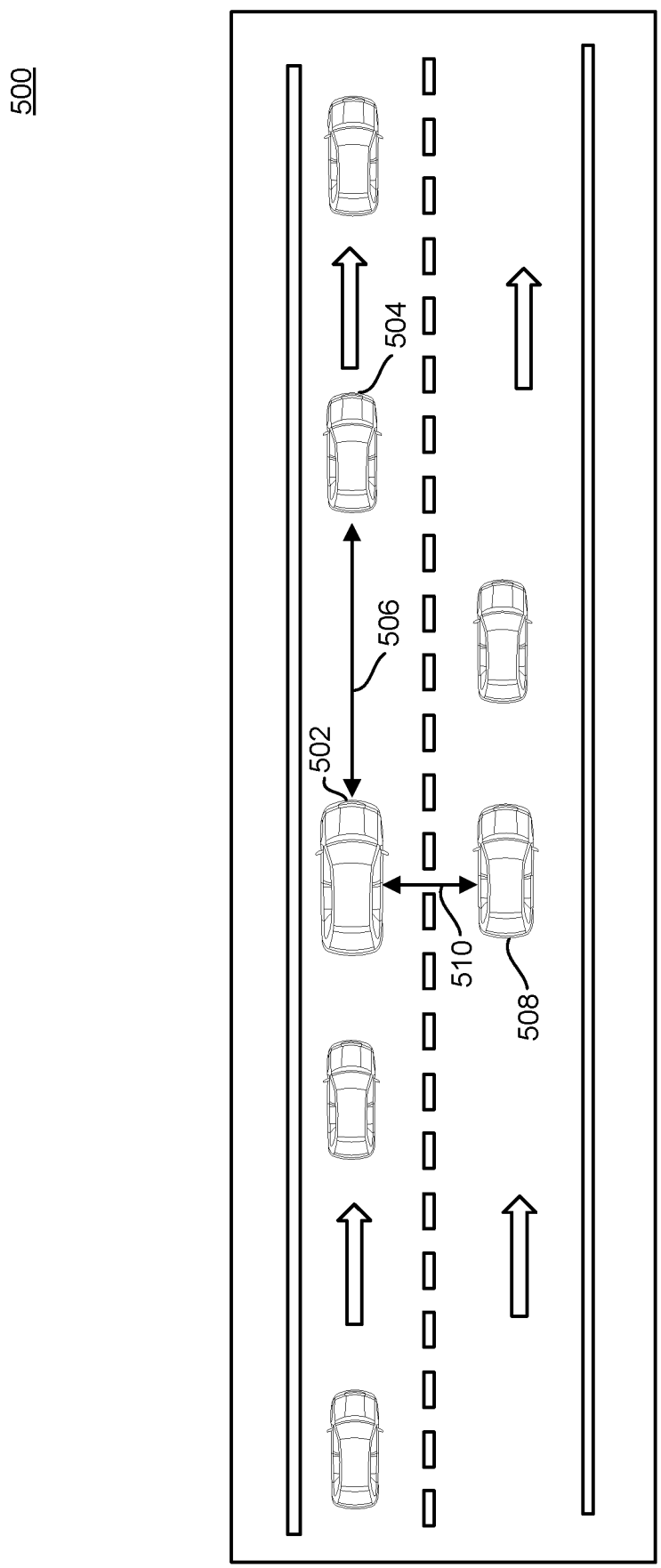
Figure 6:
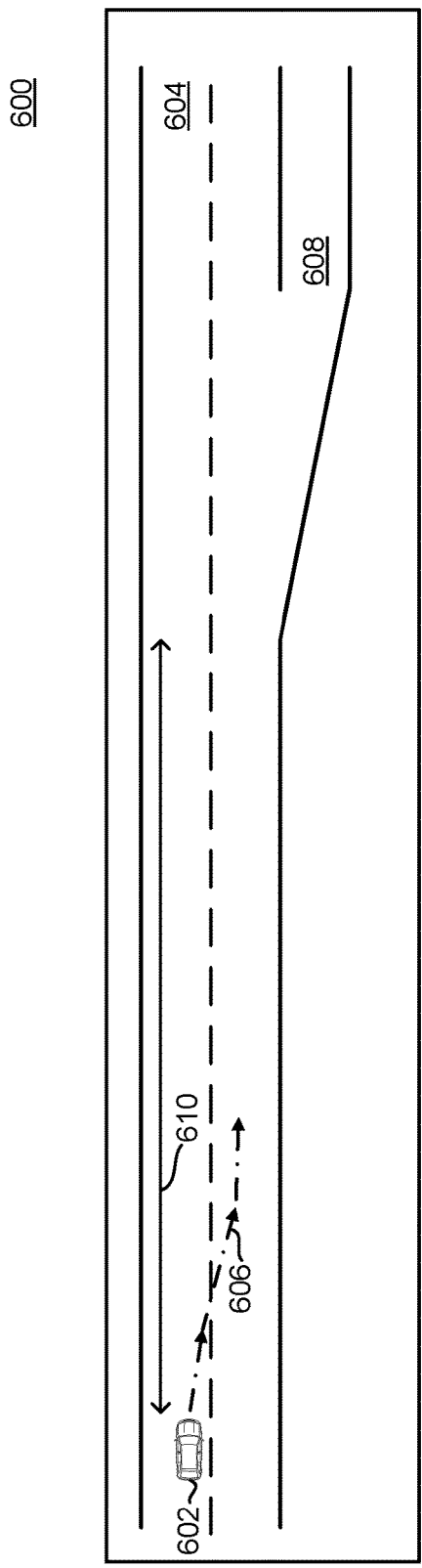
Figure 7:
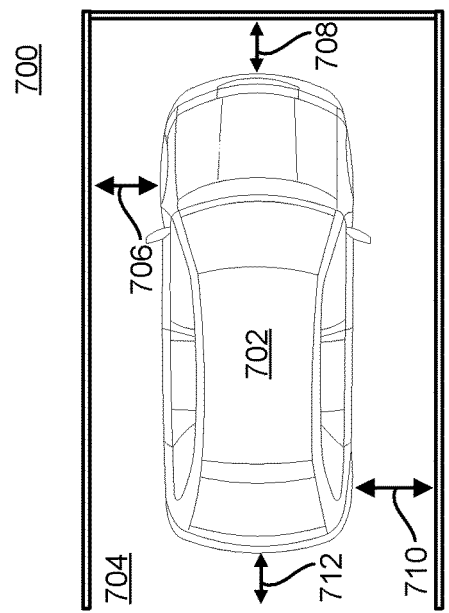

FIG. 3 shows a flow chart of an example 300 of providing baseline tuning parameter values to a driver assistance system of a vehicle. The example 300 can be used with one or more other examples described elsewhere herein. The example 300 and/or one or more of its components can operate by way of at least one processor executing instructions stored in a computer-readable medium, for example as described below with reference to FIG. 8. In some implementations, the example 300 can be configured to provide at least one customized parameter to a driver assistance system for a vehicle driver based on classification of the driver.

Here, a driver assistance system 302 (DA) is determining whether to take action in a context currently represented by circumstances 304. Solely as an example, the driver assistance system 302 could be about to decide whether to institute a lane-change maneuver. The driver assistance system 302 can formulate a query 306 to a cluster component 307. In some implementations, the query 306 indicates the contemplated maneuver. The driver assistance system 302 can query the cluster component 307 in an effort to ensure that the intended behavior and maneuvers are acceptable to the driver. For example, this can involve ascertaining that the vehicle is not going faster, is not positioned closer to other vehicles, and/or is not turning more sharply than how the driver would operate the vehicle himself or herself. The query can seek to ensure that the driver feels safe and comfortable during the maneuver. For example, this can enhance the user's operation of the driver assistance system 302 and increase the driver's overall satisfaction with the vehicle and the experience.

Responding to the query 306 can involve the cluster component 307 accessing one or more databases or other repositories of baseline tuning parameter values. The cluster component 307 can provide baseline tuning parameter values 308 in response to the query 306, or the baseline tuning parameter values 308 can be a pre-determined response (e.g., a large data set) that is provided in response to the query 306. In some implementations, the baseline tuning parameter values 308 include one or more limits on the application or implementation of the action being contemplated by the driver assistance system 302. For example, the baseline tuning parameter values 308 can include a speed limit. As another example, the baseline tuning parameter values 308 can include a limit on longitudinal and/or lateral acceleration. In some implementations, combinations of limits can be used. The result of applying the baseline tuning parameter values 308 can be that the driver assistance system 302 initiates a lane change only if the gap (i.e., separation between vehicles) in the adjacent lane is at least x feet and the driver assistance system 302 has y seconds or more at its disposal to complete the action.

Assuming that the driver assistance system 302 decides to initiate the action, the driver assistance system 302 can make one or more outputs. In some implementations, the driver assistance system 302 outputs information corresponding to a trajectory 310. The baseline tuning parameter values 308 may have specified or regulated one or more aspects of the trajectory 310. The trajectory 310 can correspond to causing the vehicle to assume particular location, speed, acceleration, and rate of change in acceleration (sometimes called "jerk"). For example, the trajectory 310 can be effectuated by setting the steering angle of the wheel(s) and the torque output of the propulsion motor(s). An execution 312 here conceptually represents that the baseline tuning parameter values 308 are being used in performing the action based on the trajectory 310. A driver 314 is a human being, and is here schematically illustrated using a circle. The driver 314 is subjected to the execution 312 of the action planned and performed by the driver assistance system 302.

The cluster component 307 and/or the driver assistance system 302 can benefit from input of a realtime data provider 316. The realtime data provider 316 can provide one or more pieces of information to be taken into account in generating the baseline tuning parameter values 308. In some implementations, comfort preferences for an event (e.g., a lane change) can depend on the situation at hand, which can be reflected by the input from the realtime data provider 316. For example, traffic density or the speed of the ego vehicle. At lower speeds, the comfort level of the driver 314 may not be a significant factor, but at greater speeds the comfort may become a significant factor. The driver assistance system 302 can be provided with information essentially stating the parameter values that apply under visible conditions. If the weather changes, this can trigger the driver assistance system 302 to submit the query 306. That is, the driver assistance system 302 installed in the vehicle can take into account realtime data about the vehicle in determining whether to provide the query to the configuration manager before taking the action.

FIGS. 4-7 show examples 400, 500, 600, and 700 of applying a baseline tuning parameter value in performing an action with regard to a vehicle. The examples 400, 500, 600, and 700 can be used with one or more other examples described elsewhere herein. In the example 400, a vehicle 402 is currently being driven on a roadway 404 that has one-way traffic proceeding in either of two adjacent lanes. Here vehicles 406 are also present on the roadway 404. Particularly, the vehicle 402 is currently positioned in the right lane and vehicles 406A-406B are currently positioned in the left lane. The terms right and left are here used from the perspective of the driver of the vehicle 402.

Assume that the driver of the vehicle 402 wishes to make a lane change and move from the right lane into the left lane. In this example, there is currently a distance 408 between the vehicles 406A-406B along the roadway 404. Relevant data can also indicate the current conditions of the roadway 404 (e.g., traffic density, road quality, weather) and of the vehicle 402 (e.g., speed, occupancy). A lane change 410 is here schematically illustrated using arrows from the right lane into the left lane. Baseline tuning parameter values for the driver of the vehicle 402 can be applied to a driver assistance system installed in the vehicle 402. The driver assistance system can obtain the relevant parameter(s) before deciding whether or how to execute a lane change. For example, the baseline tuning parameter values may inform the driver assistance system that it can execute the lane change as long as the distance between the vehicles 406A-406B is at least equal to a specified distance, and/or another condition. If the driver assistance system executes the action, this may subject the vehicle 402 to certain longitudinal and lateral acceleration, in accordance with what is acceptable to the driver according to the abstract driver profile with which the driver has been classified.

The example 400 also illustrates learnable parameters regarding a vehicle motion parameter. The lane change 410 can be characterized using one or more motion parameters, including, but not limited to, parameters reflecting motion in a lateral direction, here schematically illustrated by an arrow 412 that is perpendicular to the lane direction of the roadway 404. For example, the parameter(s) can characterize a lateral velocity in the lateral direction during the lane change 410 (e.g., the limit of such lateral velocity). As another example, the parameter(s) can characterize a lateral acceleration in the lateral direction during the lane change 410 (e.g., the limit of such lateral acceleration). As another example, the parameter(s) can characterize a lateral jerk (i.e., rate of change in acceleration) in the lateral direction during the lane change 410 (e.g., the limit of such lateral jerk). As such, baseline tuning parameter values for the driver of the vehicle 402 can be applied to a driver assistance system installed in the vehicle 402 for controlling the parameter(s) regarding lateral-direction motion during the lane change 410.

The example 500, next, in part relates to adaptive cruise control. When a vehicle 502 is driving behind a vehicle 504 in the same lane, a driver assistance system maintains approximately at least a distance 506 between the vehicles 502 and 504. If the vehicle 504 accelerates, the driver assistance system may in response accelerate the vehicle 502 (optionally up to a predefined maximum speed). If the vehicle 504 decelerates, the driver assistance system may in response brake the vehicle 502 to maintain at least the distance 506 between them. The distance 506, and/or the rate of acceleration or deceleration, can be defined by a baseline tuning parameter value.

The example 500 also illustrates lane bias. Here, a vehicle 508 is present on the roadway. The vehicle 508 and the vehicle 502 are currently side by side with each other on the roadway. For example, the vehicle 508 and the vehicle 502 may be traveling at the same speed, or either of the vehicles 502 or 508 may currently be passing the other. The vehicle 502 is currently positioned in the left lane and the vehicle 508 is currently positioned in the right lane. The terms right and left are here used from the perspective of the driver of the vehicle 502 or 508. A distance 510 between the vehicles 502 or 508 can be referred to as a lane bias. In some implementations, the distance 510 can instead correspond to a separation between the vehicle 502 and something else, including, but not limited to, a lane marker, road boundary, railing, or another landmark. Lane bias is an example of a use case for which one or more learnable parameters can be determined. As such, baseline tuning parameter values for the driver of the vehicle 502 can be applied to a driver assistance system installed in the vehicle 502 for controlling the distance 510.

The example 600 involves a distance from a roadway exit to a location of a lane change. A vehicle 602 is currently traveling on a highway 604. The vehicle 602 may perform a lane change 606, which is here schematically illustrated using arrows from the present lane into the next lane. The purpose of the lane change 606 may be to position the vehicle 602 in the rightmost lane of the highway 604 in preparation for leaving the highway 604 at an exit 608 that is upcoming. The lane change 606 may be initiated when there is at least a distance 610 between the current location of the vehicle 602 and the exit 608. For example, the distance 610 can depend on factors such as amount and speed of traffic, width or number of lanes, and/or the size of the exit 608 or the angle it forms with the highway 604. A distance from an exit to a lane change is an example of a use case for which one or more learnable parameters can be determined. As such, baseline tuning parameter values for the driver of the vehicle 602 can be applied to a driver assistance system installed in the vehicle 602 for controlling the distance 610.

The example 700 involves a parking distance. A vehicle 702 is currently located within a parking spot 704. The vehicle 702 may have already come to a stop within the parking spot 704 or may be in the process of parking. The parking can be characterized by one or more distances 706, 708, 710, or 712 between the vehicle 702 and the parking spot 704. In some implementations, any or all of the distances 706, 708, 710, or 712 can instead correspond to a separation between the vehicle 702 and something else, including, but not limited to, another vehicle or another structure. A parking distance is an example of a use case for which one or more learnable parameters can be determined. As such, baseline tuning parameter values for the driver of the vehicle 702 can be applied to a driver assistance system installed in the vehicle 702 for controlling one or more of the distances 706, 708, 710, or 712.

Figure 8:
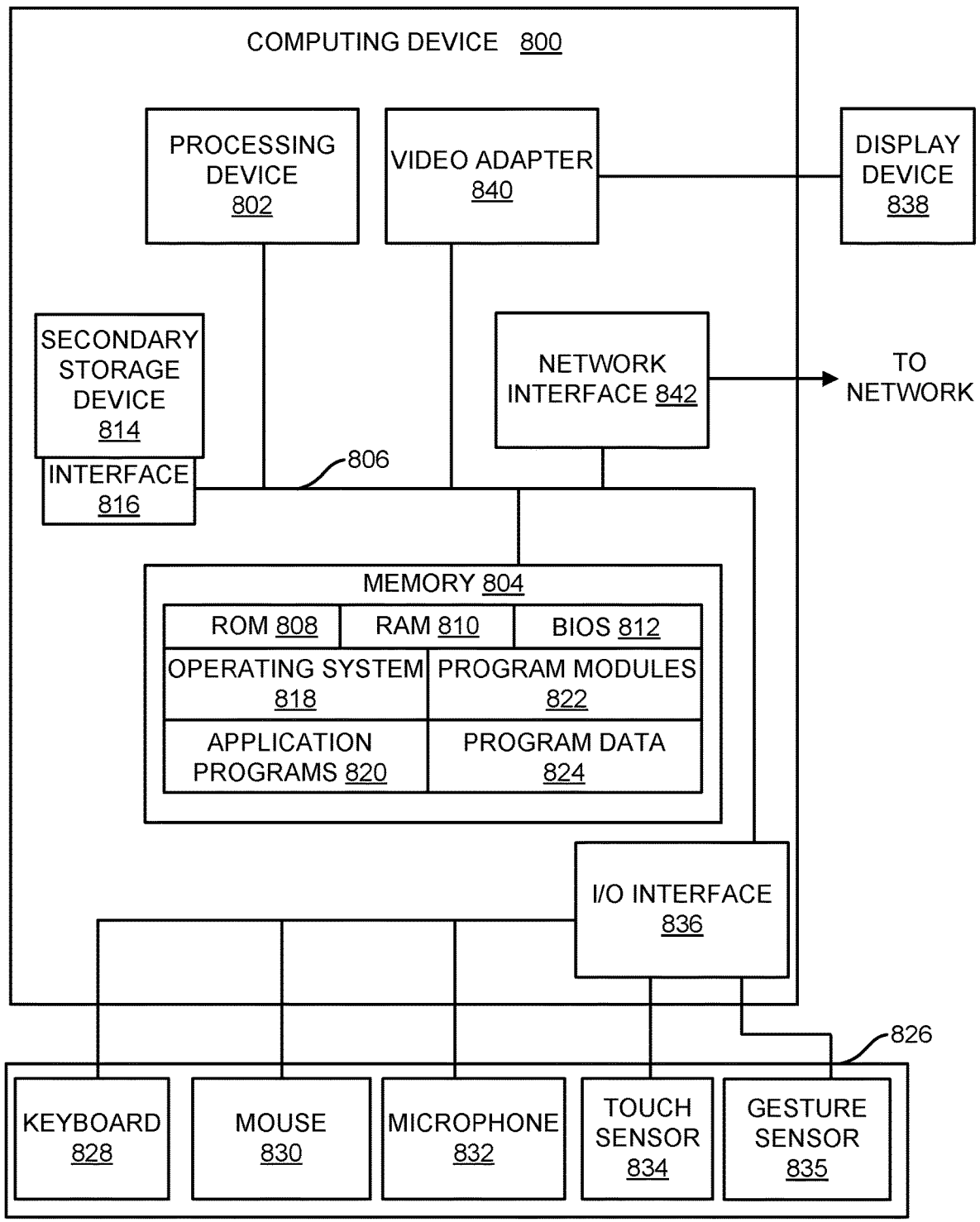
FIG. 8 illustrates an example architecture of a computing device that can be used to implement aspects of the present disclosure.

FIG. 8 illustrates an example architecture of a computing device 800 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 8 can be used to execute the operating system, application programs, and/or software modules (including the software engines) described herein.

The computing device 800 includes, in some embodiments, at least one processing device 802 (e.g., a processor), such as a central processing unit (CPU). A variety of processing devices are available from a variety of manufacturers, for example, Intel or Advanced Micro Devices. In this example, the computing device 800 also includes a system memory 804, and a system bus 806 that couples various system components including the system memory 804 to the processing device 802. The system bus 806 is one of any number of types of bus structures that can be used, including, but not limited to, a memory bus, or memory controller; a peripheral bus; and a local bus using any of a variety of bus architectures.

Examples of computing devices that can be implemented using the computing device 800 include a desktop computer, a laptop computer, a tablet computer, a mobile computing device (such as a smart phone, a touchpad mobile digital device, or other mobile devices), or other devices configured to process digital instructions.

The system memory 804 includes read only memory 808 and random access memory 810. A basic input/output system 812 containing the basic routines that act to transfer information within computing device 800, such as during start up, can be stored in the read only memory 808.

The computing device 800 also includes a secondary storage device 814 in some embodiments, such as a hard disk drive, for storing digital data. The secondary storage device 814 is connected to the system bus 806 by a secondary storage interface 816. The secondary storage device 814 and its associated computer readable media provide non-volatile and non-transitory storage of computer readable instructions (including application programs and program modules), data structures, and other data for the computing device 800.

Although the example environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 814 and/or system memory 804, including an operating system 818, one or more application programs 820, other program modules 822 (such as the software engines described herein), and program data 824. The computing device 800 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 800 through one or more input devices 826. Examples of input devices 826 include a keyboard 828, mouse 830, microphone 832 (e.g., for voice and/or other audio input), touch sensor 834 (such as a touchpad or touch sensitive display), and gesture sensor 835 (e.g., for gestural input). In some implementations, the input device(s) 826 provide detection based on presence, proximity, and/or motion. In some implementations, a user may walk into their home, and this may trigger an input into a processing device. For example, the input device(s) 826 may then facilitate an automated experience for the user. Other embodiments include other input devices 826. The input devices can be connected to the processing device 802 through an input/output interface 836 that is coupled to the system bus 806. These input devices 826 can be connected by any number of input/output interfaces, such as a parallel port, serial port, game port, or a universal serial bus. Wireless communication between input devices 826 and the input/output interface 836 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 838, such as a monitor, liquid crystal display device, light-emitting diode display device, projector, or touch sensitive display device, is also connected to the system bus 806 via an interface, such as a video adapter 840. In addition to the display device 838, the computing device 800 can include various other peripheral devices (not shown), such as speakers or a printer.

The computing device 800 can be connected to one or more networks through a network interface 842. The network interface 842 can provide for wired and/or wireless communication. In some implementations, the network interface 842 can include one or more antennas for transmitting and/or receiving wireless signals. When used in a local area networking environment or a wide area networking environment (such as the Internet), the network interface 842 can include an Ethernet interface. Other possible embodiments use other communication devices. For example, some embodiments of the computing device 800 include a modem for communicating across the network.

The computing device 800 can include at least some form of computer readable media. Computer readable media includes any available media that can be accessed by the computing device 800. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 800.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 8 is also an example of programmable electronics, which may include one or more such computing devices, and when multiple computing devices are included, such computing devices can be coupled together with a suitable data communication network so as to collectively perform the various functions, methods, or operations disclosed herein.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
   receiving first telemetry data generated by sensors of respective first vehicles in a fleet;
   projecting the received first telemetry data into an abstract space, wherein projecting the received first telemetry data into the abstract space comprises combining first and second values having different physical units with each other to form a third value;
   clustering the first telemetry data into groups, each of the groups representing a profile of one or more first drivers of the first vehicles in the fleet;
   receiving second telemetry data generated by sensors of a second vehicle controlled by a second driver;
   associating the second driver with a first group of the groups by classifying the received second telemetry data;
   providing a subset of the first telemetry data corresponding to the first group as a baseline dataset for training of machine learning algorithms;
   generating baseline tuning parameter values using the trained machine learning algorithms; and
   providing the baseline tuning parameter values to a driver assistance system of a third vehicle controlled by the second driver.

2. The computer-implemented method of claim 1, further comprising filtering the first telemetry data to filtered telemetry data, wherein clustering the first telemetry data into the groups comprises clustering the filtered telemetry data into the groups.

3. The computer-implemented method of claim 1, further comprising augmenting the first telemetry data to augmented telemetry data, wherein clustering the first telemetry data into the groups comprises clustering the augmented telemetry data into the groups.

4. The computer-implemented method of claim 1, further comprising performing dimension reduction on the received first telemetry data to generate dimension-reduced telemetry data, wherein clustering the first telemetry data into the groups comprises clustering the dimension-reduced telemetry data into the groups.

5. The computer-implemented method of claim 4, wherein performing the dimension reduction on the received first telemetry data comprises projecting the received first telemetry data into the abstract space.

6. The computer-implemented method of claim 5, wherein classifying the received second telemetry data comprises projecting the received second telemetry data into the abstract space.

7. The computer-implemented method of claim 1, wherein the baseline tuning parameter values control at least one aspect of the driver assistance system, the aspect including one or more of a distance between the third vehicle and an object, a speed of the third vehicle, a trajectory of the third vehicle, or an acceleration of the third vehicle.

8. The computer-implemented method of claim 1, wherein the third vehicle is the second vehicle.

9. The computer-implemented method of claim 1, wherein receiving the second telemetry data includes performing event detection to record a specific scenario.

10. The computer-implemented method of claim 1, wherein clustering the first telemetry data into the groups comprises specifying how many the groups must be.

11. The computer-implemented method of claim 1, further comprising, before providing the baseline dataset for the training of the machine learning algorithms, obfuscating an association between the baseline dataset and the second driver.

12. The computer-implemented method of claim 11, wherein obfuscating the association between the baseline dataset and the second driver comprises applying a hash function to (i) a vehicle identification number of the second vehicle and to (ii) a user identifier for the second driver.

13. The computer-implemented method of claim 1, further comprising training a feature generation algorithm using the second telemetry data.

14. The computer-implemented method of claim 13, wherein the feature generation algorithm is trained to generate a parameter value candidate for at least one of (i) a time gap; (ii) a lane change duration parameter; (iii) a distance from an exit to a lane change; (iv) a lane bias; (v) in a lateral direction, a velocity, acceleration, or jerk; or (vi) a parking distance.

15. The computer-implemented method of claim 1, wherein the machine learning algorithms include at least one of a regression algorithm or a classification algorithm.

16. The computer-implemented method of claim 1, wherein combining the first and second values with each other to form the third value comprises adding a dimension to the first telemetry data that does not have real-world significance.

17. The computer-implemented method of claim 16, wherein the different physical units are distance and speed, and wherein combining the first and second values with each other comprises adding the first and second values to each other.

18. A computer program product tangibly embodied in a non-transitory storage medium, the computer program product including instructions that when executed cause a processor to perform operations, the operations comprising:
receiving first telemetry data generated by sensors of respective first vehicles in a fleet;
projecting the received first telemetry data into an abstract space, wherein projecting the received first telemetry data into the abstract space comprises combining first and second values having different physical units with each other to form a third value;
clustering the first telemetry data into groups, each of the groups representing a profile of one or more first drivers of the first vehicles in the fleet;
receiving second telemetry data generated by sensors of a second vehicle controlled by a second driver;
associating the second driver with a first group of the groups by classifying the received second telemetry data;
providing a subset of the first telemetry data corresponding to the first group as a baseline dataset for training of machine learning algorithms;
generating baseline tuning parameter values using the trained machine learning algorithms; and
providing the baseline tuning parameter values to a driver assistance system of a third vehicle controlled by the second driver.

19. The computer program product of claim 18, the operations further comprising filtering the first telemetry data to filtered telemetry data, wherein clustering the first telemetry data into the groups comprises clustering the filtered telemetry data into the groups.

20. The computer program product of claim 18, the operations further comprising augmenting the first telemetry data to augmented telemetry data, wherein clustering the first telemetry data into the groups comprises clustering the augmented telemetry data into the groups.

21. The computer program product of claim 18, the operations further comprising performing dimension reduction on the received first telemetry data to generate dimension-reduced telemetry data, wherein clustering the first telemetry data into the groups comprises clustering the dimension-reduced telemetry data into the groups.

22. The computer program product of claim 18, the operations further comprising, before providing the baseline dataset for the training of the machine learning algorithms, obfuscating an association between the baseline dataset and the second driver.

23. The computer program product of claim 18, the operations further comprising training a feature generation algorithm using the second telemetry data.

* * * * *